United States Patent
Evans et al.

(10) Patent No.: US 9,699,612 B2
(45) Date of Patent: *Jul. 4, 2017

(54) SYSTEMS AND METHODS FOR LOCATING A TRACKING DEVICE

(71) Applicant: Tile, Inc., San Mateo, CA (US)

(72) Inventors: Nicholas George Evans, San Francisco, CA (US); Michael George Farley, San Mateo, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,826

(22) Filed: May 3, 2016

(65) Prior Publication Data
US 2016/0249168 A1 Aug. 25, 2016

Related U.S. Application Data

(63) Continuation of application No. 14/167,960, filed on Jan. 29, 2014, now Pat. No. 9,357,348, and a continuation of application No. 29/470,567, filed on Oct. 22, 2013, now Pat. No. Des. 723,957.

(60) Provisional application No. 61/757,731, filed on Jan. 29, 2013, provisional application No. 61/872,478, filed on Aug. 30, 2013.

(51) Int. Cl.
| | |
|---|---|
| H04W 4/02 | (2009.01) |
| G06F 21/88 | (2013.01) |
| H04W 4/20 | (2009.01) |
| H04L 29/08 | (2006.01) |
| H04W 92/18 | (2009.01) |

(52) U.S. Cl.
CPC ............ *H04W 4/023* (2013.01); *G06F 21/88* (2013.01); *H04W 4/028* (2013.01); *H04W 4/206* (2013.01); *G06F 2221/2111* (2013.01); *H04L 67/26* (2013.01); *H04L 67/306* (2013.01); *H04W 92/18* (2013.01)

(58) Field of Classification Search
None
See application file for complete search history.

(56) References Cited

U.S. PATENT DOCUMENTS

| | | |
|---|---|---|
| 4,682,155 A | 7/1987 | Shirley |
| 5,731,757 A | 3/1998 | Layson, Jr. |

(Continued)

FOREIGN PATENT DOCUMENTS

| | | |
|---|---|---|
| KR | 20100068850 | 6/2010 |

OTHER PUBLICATIONS

TrackR, 2014, Phone Halo Inc., 5 pages, [Online] [Retrieved on Jul. 24, 2014] Retrieved from the Internet<URL:http://www.thetrackr.com/>.

(Continued)

*Primary Examiner* — German J Viana Di Prisco
(74) *Attorney, Agent, or Firm* — Fenwick & West LLP

(57) ABSTRACT

The principles described herein provide methods and systems for locating a tracking device. In particular, one disclosed method includes associating a user with a tracking device, receiving an indication that the tracking device is lost, setting a flag indicating that the tracking device is lost, receiving a location within a proximity of the tracking device from one of a plurality of mobile devices associated with a community of users, and providing the location to the user.

18 Claims, 11 Drawing Sheets

(56) References Cited

U.S. PATENT DOCUMENTS

| | | | |
|---|---|---|---|
| 5,973,599 | A | 10/1999 | Nicholson et al. |
| 6,297,737 | B1 | 10/2001 | Irvin |
| 7,034,684 | B2 | 4/2006 | Boman et al. |
| D555,019 | S | 11/2007 | Au Yeung |
| 7,420,465 | B2 | 9/2008 | Ritter |
| 7,502,619 | B1 | 3/2009 | Katz |
| D611,366 | S | 3/2010 | Register et al. |
| D615,427 | S | 5/2010 | Au Yeung |
| D632,984 | S | 2/2011 | Register et al. |
| D635,874 | S | 4/2011 | Tseng et al. |
| D637,097 | S | 5/2011 | Tseng |
| D644,542 | S | 9/2011 | Henne et al. |
| D659,569 | S | 5/2012 | Shadovitz |
| D665,679 | S | 8/2012 | Shigeno et al. |
| D665,680 | S | 8/2012 | Shigeno et al. |
| D674,715 | S | 1/2013 | Dalton |
| D677,589 | S | 3/2013 | Jung et al. |
| D682,126 | S | 5/2013 | Tello |
| D684,071 | S | 6/2013 | Greenwood et al. |
| 8,506,524 | B2 | 8/2013 | Graskov et al. |
| D693,248 | S | 11/2013 | Anderssen et al. |
| D693,249 | S | 11/2013 | Anderssen et al. |
| D693,250 | S | 11/2013 | Anderssen et al. |
| D699,131 | S | 2/2014 | Marshall et al. |
| D700,084 | S | 2/2014 | Hsu |
| D702,141 | S | 4/2014 | Jung et al. |
| D728,393 | S | 5/2015 | Au Yeung |
| D729,655 | S | 5/2015 | Bauer et al. |
| D731,334 | S | 6/2015 | Fiedler et al. |
| 2002/0147650 | A1 | 10/2002 | Kaufman et al. |
| 2003/0095032 | A1 | 5/2003 | Hoshino et al. |
| 2003/0235172 | A1 | 12/2003 | Wood |
| 2004/0174264 | A1 | 9/2004 | Reisman et al. |
| 2004/0198389 | A1 | 10/2004 | Alcock et al. |
| 2005/0200478 | A1 | 9/2005 | Koch et al. |
| 2006/0158310 | A1 | 7/2006 | Klatsmanyi et al. |
| 2008/0062120 | A1 | 3/2008 | Wheeler et al. |
| 2008/0129485 | A1* | 6/2008 | Tuttle .................. G06K 7/0008 340/539.11 |
| 2008/0172173 | A1 | 7/2008 | Chang et al. |
| 2008/0191846 | A1* | 8/2008 | Chang .................... G01S 3/046 340/10.41 |
| 2010/0164715 | A1 | 7/2010 | Buller et al. |
| 2011/0068923 | A1* | 3/2011 | Burket ............... G08B 13/1427 340/572.1 |
| 2011/0263331 | A1 | 10/2011 | Koski et al. |
| 2012/0309408 | A1 | 12/2012 | Marti et al. |
| 2014/0369695 | A1 | 12/2014 | D'Andrade et al. |
| 2015/0057518 | A1 | 2/2015 | Lebel et al. |
| 2015/0112264 | A1 | 4/2015 | Kamen et al. |
| 2015/0356862 | A1* | 12/2015 | Daoura ................. G08B 25/10 340/686.6 |

OTHER PUBLICATIONS

Summers, Nick, "Linquet Mini takes the crowdfunding route to help you protect your iPhone and valuables via Bluetooth", Feb. 20, 2013 http://www.thenextweb.com/gadgts/2013/02/20/crowdfunding-campaign-launche- d-for-linquet-mini-a-new-anti-theft-device-that-protects-you-iphone-and-va- luable/.

Honig, Zach, "StickNFind Bluetooth stickers let you tag and locate your goods with a smartphone (hands-on-video)", Jan. 2, 2013 http://www.engadget.com/2013/01/02/sticknfind-bluetooth-stickers-hands-on- /.

Cao Gadgets LLC, "Monitor and Find Everything in Your Home or Office from the Internet", access Sep. 23, 2013 http:/www.wirelesstag.net/index_ie.html.

Wavetrend Technologies Limited, "ActivDuo Mini Asset Tag TG1810-A", Feb. 2009.

United States Office Action, U.S. Appl. No. 14/167,960, Nov. 23, 2015, 19 pages.

United States Office Action, U.S. Appl. No. 14/167,960, Aug. 20, 2015, 15 pages.

United States Office Action, U.S. Appl. No. 14/167,960, Apr. 30, 2015, 16 pages.

United States Office Action, U.S. Appl. No. 15/257,708, Oct. 21, 2016, 7 pages.

* cited by examiner

SYSTEMS AND METHODS FOR LOCATING A TRACKING DEVICE

CROSS REFERENCES TO RELATED APPLICATIONS

This application is a continuation of U.S. application Ser. No. 14/167,960, filed Jan. 29, 2014, now U.S. Pat. No. 9,357,348, which claims the benefit of and priority of U.S. Provisional Application No. 61/757,731 entitled "Distributed system for locating items," filed on Jan. 29, 2013, U.S. Provisional Application No. 61/872,478 entitled "Tracking Device," filed on Aug. 30, 2013, and U.S. Design Patent Application No. 29/470,567 entitled "Electronic Tracking Device," filed on Oct. 22, 2013, the entireties of which are incorporated herein by reference.

BACKGROUND OF THE INVENTION

1. The Field of the Invention

One or more embodiments of the present invention relate generally to systems and methods for locating a tracking device. More specifically, one or more embodiments of the present invention relate to systems and methods for utilizing a community of users to locate a tracking device.

2. Background and Relevant Art

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object, (e.g., if it becomes lost).

However, traditional tracking devices and corresponding systems suffer from one or more disadvantages. For example, locating a tracking device from a far-away distance requires a considerable amount of power. Thus, battery life of a tracking device is often limited. Further, technology for long-range tracking is expensive, and often requires sophisticated circuitry for operating in connection with an associated electronic device (e.g., mobile device).

Additionally, low-power options for tracking devices are limited to tracking objects within require that a user be within a close proximity of the tracking devices. Thus, tracking devices that use low power and/or less complex circuitry are often limited to providing the location of an object that is already near to a user.

Accordingly, there are a number of considerations to be made in providing tracking device systems.

BRIEF SUMMARY OF THE INVENTION

Embodiments of the present invention provide systems and methods for locating a tracking device. In particular, one or more embodiments relate to a method for locating a tracking device by leveraging the capabilities of a mobile device and a community of mobile device users. In one configuration, a method includes associating a user with a tracking device. The method further includes receiving an indication that the tracking device is lost. The method further includes setting a flag indicating that the tracking device is lost. The method further includes receiving a location within a proximity of the tracking device from one a plurality of mobile devices associated with a community of users. The method also includes providing the location to the user.

Another method is also described which includes a mobile device providing tracking device information and user information to a tracking system for associating a user with a tracking device. The method further includes sending an indication to the tracking system indicating that the tracking device is lost and receiving a response to the lost indication including a location within a proximity of the tracking device based on a location for the tracking device received from one of a plurality of mobile devices associated with a community of users.

Another method is also described which includes a mobile device detecting a signal from a tracking device. The method further includes detecting a location of the mobile device, and sending an electronic communication to a tracking system indicating an identification of the tracking device and the location. Detecting the signal and sending the electronic communication are performed without input from a user of the mobile device.

Additional features and advantages of the present invention will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
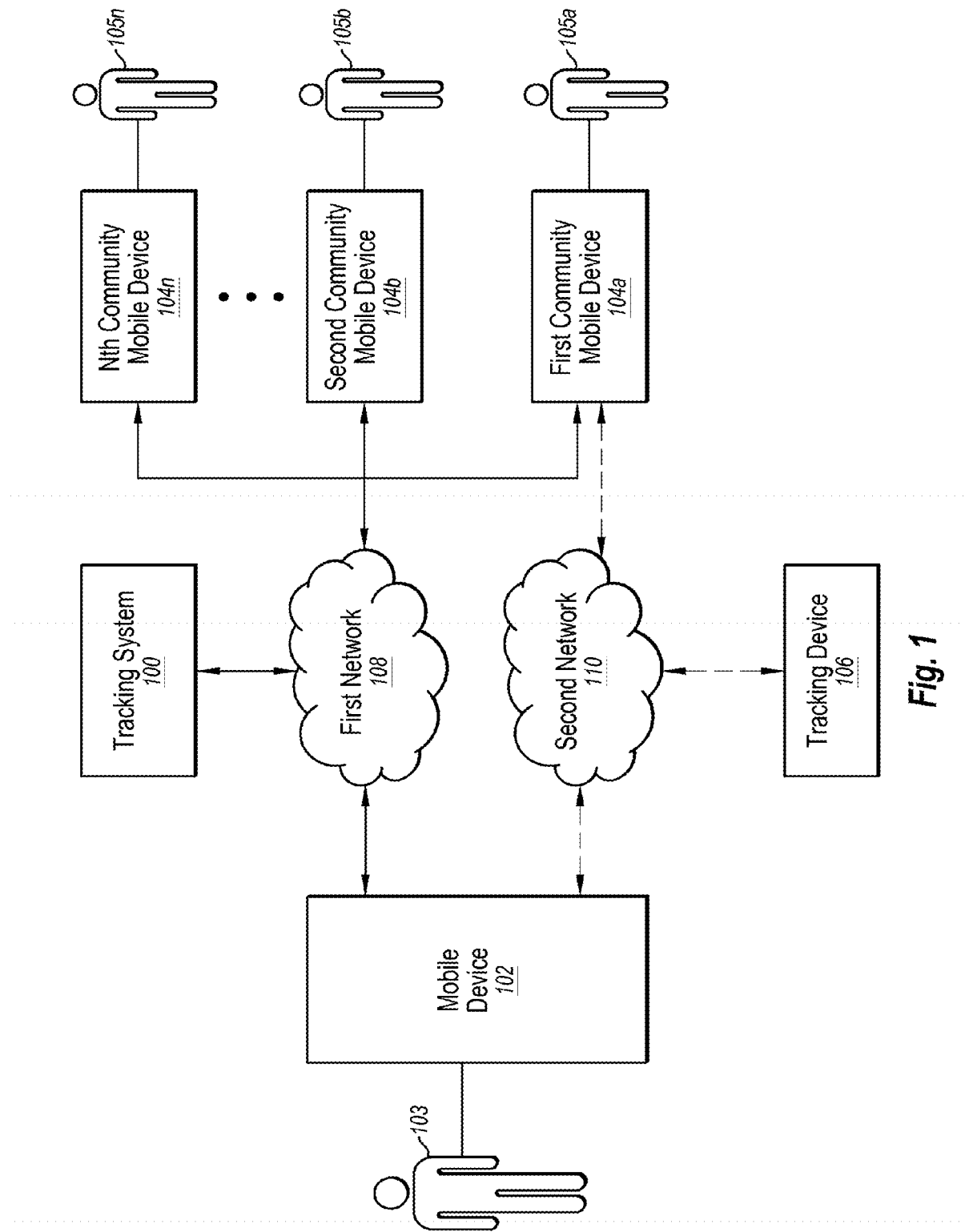
FIG. 1 illustrates an exemplary implementation for locating a tracking device according to principles described herein.

Embodiments of the present invention provide benefits and/or solve one or more of the foregoing or other problems in the art for locating a tracking device. In particular, example implementations of the present invention provide a user with the ability to locate one or more low-power tracking devices by leveraging the capabilities of a plurality of mobile devices associated with a community of users (e.g., users of the same tracking device system).

In accordance with embodiments of the present application, a user can attach a tracking device to or enclose the tracking device within an object, such as a wallet, keys, a car, a bike, a pet, or any other object that the user wants to track. The user can then use a mobile device (e.g., by way of a software application installed on the mobile device) to track the tracking device and corresponding object. For example, the mobile device may be used to perform a local search for a tracking device attached to a near-by object. However, in situations where the user is unable to locate the tracking device using their own mobile device (e.g., if the tracking device is beyond a distance within which the mobile device and the tracking device can communicate), the principles described herein allow the user to leverage the capabilities of a community of users of a tracking device system.

In particular, a tracking system disclosed herein can maintain user profiles associated with a plurality of users of the system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. Therefore, when one of a community of mobile devices that are scanning for nearby tracking devices and providing updated locations to the tracking system, the tracking system can associate the received location with a flagged tracking device, and relay the location to a user of the tracking device, thereby enabling the user to locate and track down the tracking device.

In addition to utilizing a general community of users, a user of the tracking system may desire to utilize the tracking capabilities of a specific group of one or more known users (e.g., friends or family of the user). For example, a user may indicate one or more friends or other users with which a tracking device may be shared. Sharing the tracking device may provide the ability for a friend to quickly determine if a tracking device is close-by without also querying a larger community of users, or to enable a friend to contact a user directly with information about the location of a lost tracking device.

Exemplary systems and methods will now be described in reference to the drawings.

FIG. 1 illustrates an exemplary implementation in which a tracking system 100 is communicatively coupled to a mobile device 102 associated with the user 103 and a plurality of community mobile devices 104a through 104n (collectively referred to herein as "community mobile devices 104") associated with a plurality of users 105a through 105n of the tracking system 100 (collectively referred to herein as "community users 105"). As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. Accordingly, the mobile device 102 and community mobile devices 104 are only able to communicate with the tracking device 106 if they are within a close proximity to the tracking device. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. However, if the mobile device 102 is located beyond the range of communication with the tracking device 106 (e.g., beyond the second network 110), the mobile device 102 will be unable to assist the user 103 in finding the tracking device 106. In such situations, the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication with the tracking device 106 (e.g., if the community mobile device 104 is within range or moves within range of the communication capabilities of the tracking device 106 and receives a signal from the tracking device 106 comprising the unique identifier), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 116. For example, an implementation may include a first community mobile device 112a associated with a first community user 116a, a second community mobile device 112b associated with a second community user 116b, up to an nth community mobile device 112n associated with an nth community user 116n. The community mobile devices 112 may also include functionality that enables each community mobile device 112 to identify a tracking device 106 within a proximity of the community mobile device 112. In one example, a first community mobile device 112a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may constantly transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102. In some cases, the strength of signal or absence of a signal may be used to indicate that a tracking device 106 is lost.

Figure 2:
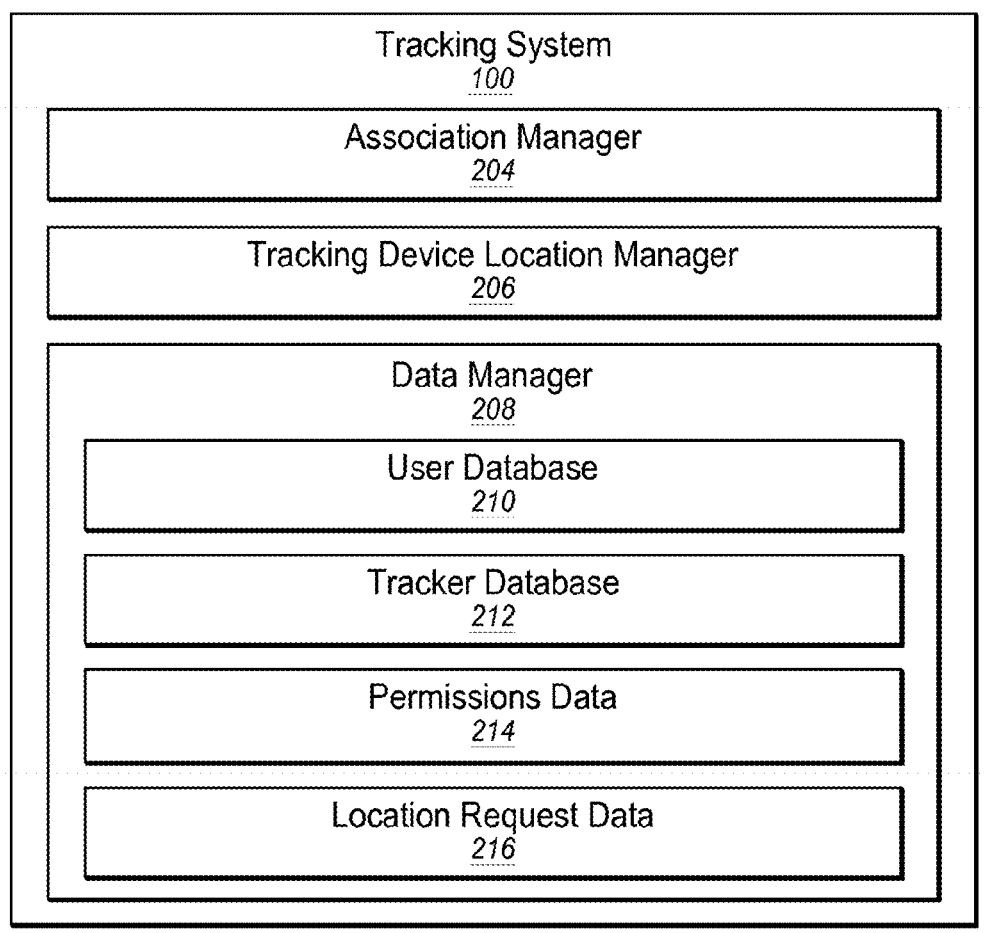
FIG. 2 illustrates an exemplary tracking system of the implementation of FIG. 1.

FIG. 2 illustrates a diagram showing example components of the tracking system 100. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106. The tracking device location manager 206 may also be used to receive and process a response to a tracking request that is received from one or more community mobile devices 104 that detect the tracking device 106 and respond to the tracking request. For example, the tracking system 100 may receive a response to the tracking request indicating a location within a proximity of the tracking device 106 and provide a last known location within a proximity of the tracking device 106 as provided by the community mobile device 104.

In one configuration, the tracking device location manager 206 may receive an indication that a tracking device 106 is lost from the mobile device 102 and store the lost indication on a database. When the tracking device location manager 206 receives an indication that the tracking device 106 is lost, the tracking device location manager 206 may set a flag indicating that the tracking device 106 is lost. Setting a flag for a tracking device 106 may include storing and/or associating a value associated with the tracking device that indicates that the tracking device 106 is lost. This may include setting a flag, marker, digital value, or other indication that the tracking device 106 is lost and maintaining or storing the indication of the lost tracking device 106 on the tracking system 100 (e.g., on a database).

The tracking device location manager 206 may further receive updated locations from the community of mobile devices 104 that are constantly scanning for nearby tracking devices 106. In this example, the tracking device location manager 206 may receive location updates from the community of mobile devices 104 and, based on the tracking device 106 being indicated as lost, provide a response to a lost indication to the mobile device 102. The response to the lost indication may be a text message, push notification, ring tone, automated voice message, or other response for informing a user 103 that a tracking device 106 has been found and/or an updated location of the tracking device 106.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting a proximity of the tracking device 106. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate a tracking device 106 using an account and/or mobile device 102 associated with the user 103. Location request data 216 may include information related to a location request or a lost indication received from the user 103 via a mobile device 102.

Figure 3:
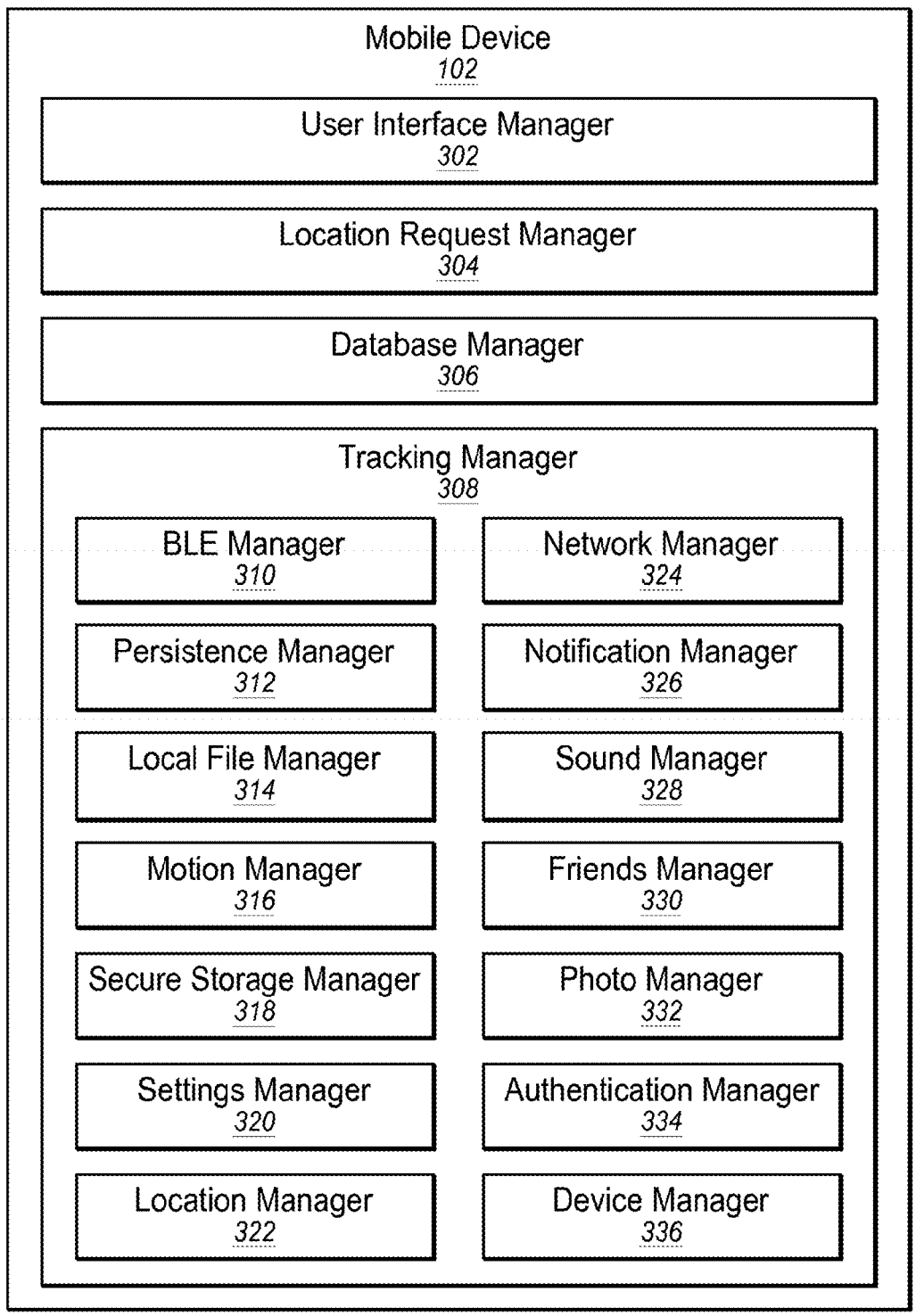
FIG. 3 illustrates an exemplary user mobile device of the implementation of FIG. 1.

FIG. 3 illustrates a diagram showing example components of the mobile device 102. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
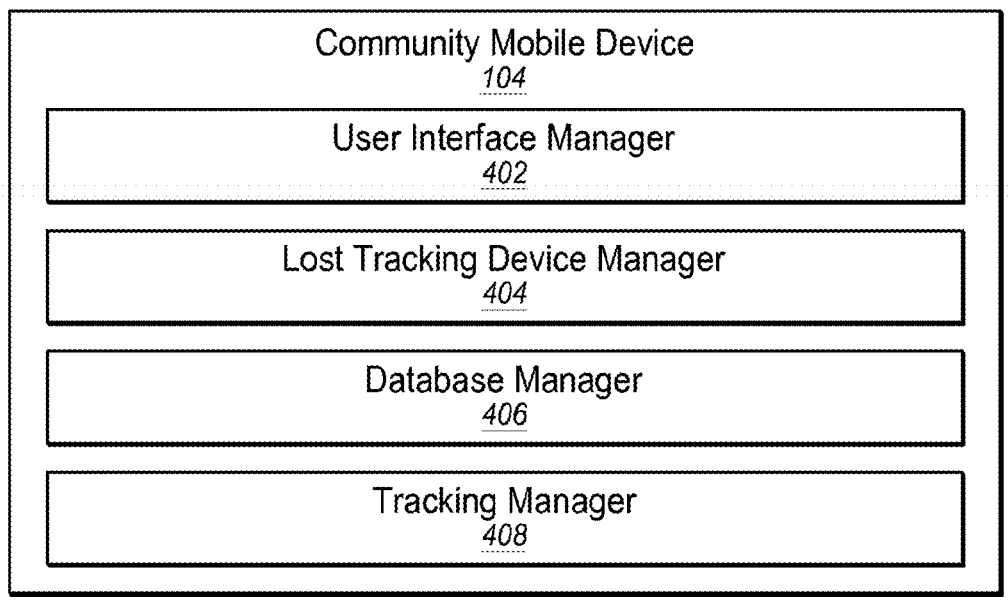
FIG. 4 illustrates an exemplary community mobile device of the implementation of FIG. 1.

FIG. 4 illustrates a diagram showing example components of a community mobile device 104. As shown, the community mobile device 104 may include, but is not limited to, a user interface manager 402, a lost tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a lost tracking device manager 404. The lost tracking device manager 404 may facilitate scanning for nearby tracking devices 106. In some configurations, the lost tracking device manager 404 can continuously or periodically scan (e.g., once per second) for nearby tracking devices 106. The lost tracking device manager 404 may determine whether to provide an updated location of the nearby tracking device 106 to the tracking system 100. In some configurations, the lost tracking device manager 404 provides a location of a nearby tracking device 106 automatically. Alternatively, the lost tracking device manager 404 may determine whether the location of the tracking device 106 has been recently updated, and determine whether to provide an updated location based on the last time a location of the tracking device 106 has been updated (e.g., by the community mobile device 104). For example, where the community mobile device 104 has provided a recent update of the location of a tracking device 106, the lost tracking device manager 404 may decide to wait a predetermined period of time (e.g., 5 minutes) before providing an updated location of the same tracking device 106.

In one configuration, the lost tracking device manager 404 may receive and process a location request or other information relayed to the community mobile device 104 by the tracking system 100. For example, the lost tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the lost tracking device manager 404 may generate and transmit a response to the location request to the tracking system 100, which may be provided to the user 103 associated with the lost tracking device 106. Further, generating and transmitting the response to the tracking request may be conditioned on the status of the tracking device 106 being flagged as lost by the mobile device 102 and/or the tracking system 100.

The lost tracking device manager 404 may additionally provide other information to the tracking system 100 in response to receiving the tracking request. For example, in addition to providing a location of the community mobile device 104, the lost tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the lost tracking device manager 404 may determine whether to send a location within the proximity of the tracking device 106 to the tracking system 100. The determination of whether to send a location to the tracking system 100 may be based on a variety of factors. For example, a lost tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
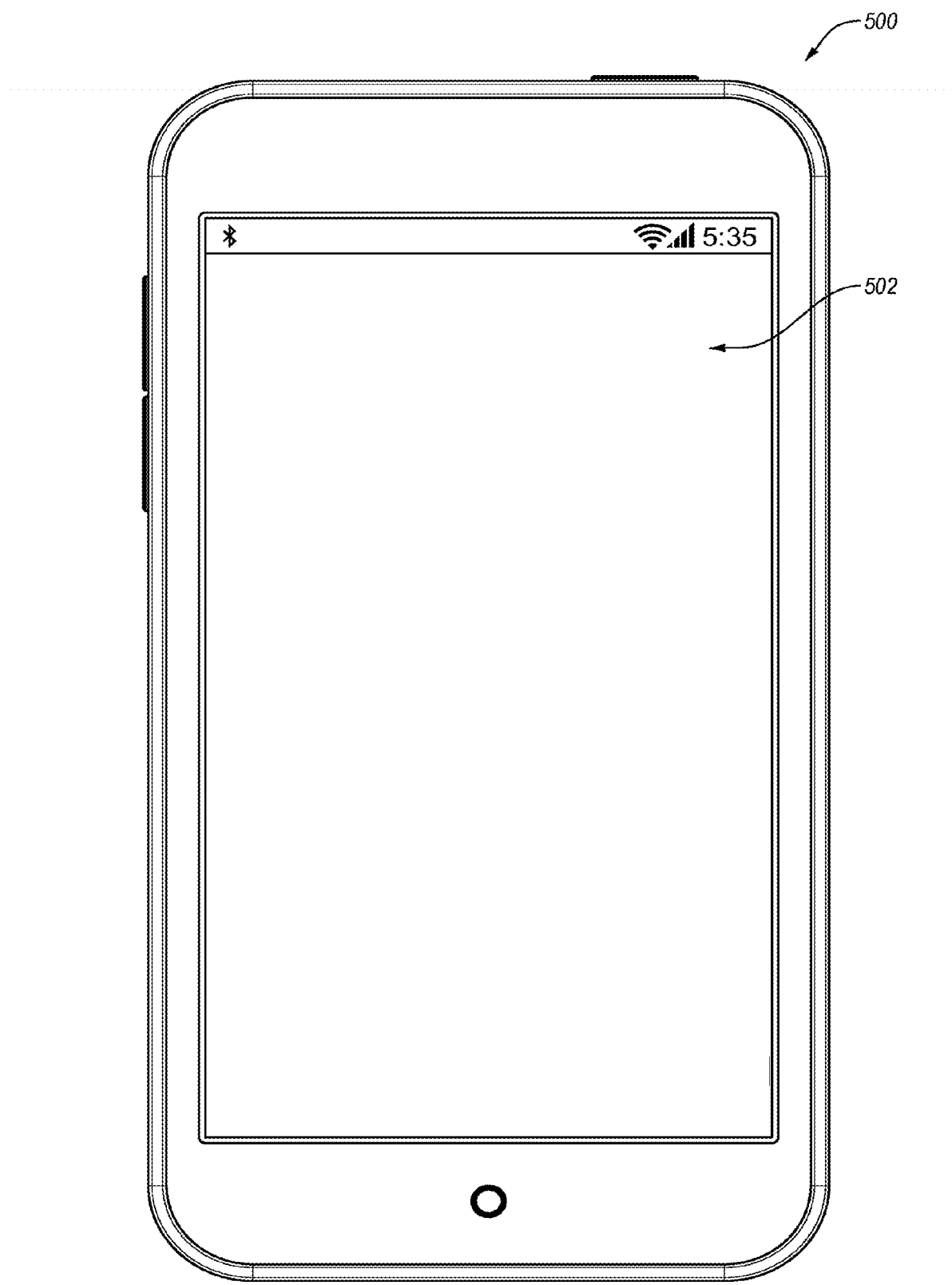
FIG. 5 illustrates an exemplary mobile device according to principles described herein.

FIG. 5 illustrates one configuration of a mobile device 500 (e.g., a smartphone) that may be implemented in a system for locating a tracking device 106. Additionally, the system described above in FIG. 1 may be implemented by other suitable computing devices, such as, but not limited to, a tablet, a handheld device, a laptop or desktop computer, a personal-digital assistant device, and/or any other suitable computing device configured to perform one or more of the processes and/or operations described herein. As illustrated in FIG. 5, the mobile device 500 may include a touchscreen 502 by way of which a user interface may be presented and/or by way of which user input may be received by the mobile device 102. Additionally or alternatively, the mobile device 102 may include any other suitable input device (e.g., a keypad, one or more input buttons, a touch screen). It will be appreciated that the mobile device 500 illustrated in FIG. 5 may be one configuration of a mobile device 102 or any one of the community mobile devices 104 implemented in the system for locating a tracking device 106.

In some configurations, the user 103 may utilize the touch screen 502 to provide one or more touch gestures, interact with a user interface, and/or access information about the user 103 and/or tracking device 106. To illustrate, the user 103 may utilize the touch screen 502 to browse, search, and select tracking devices 106 and select options associated therewith. For example, the user 103 may select a tracking device 106 and perform a local search for the tracking device 106. Additionally, the user 103 may use the touch screen 502 to select a location request causing the mobile device 102 to provide an indication of a lost tracking device 106 to tracking system 100 to be relayed (e.g., broadcast) to community of mobile devices 104. It will be understood that various areas comprising the touch screen 502 may be arranged in any manner conductive to facilitate input and viewing of items on the mobile device 500.

Figure 6A:
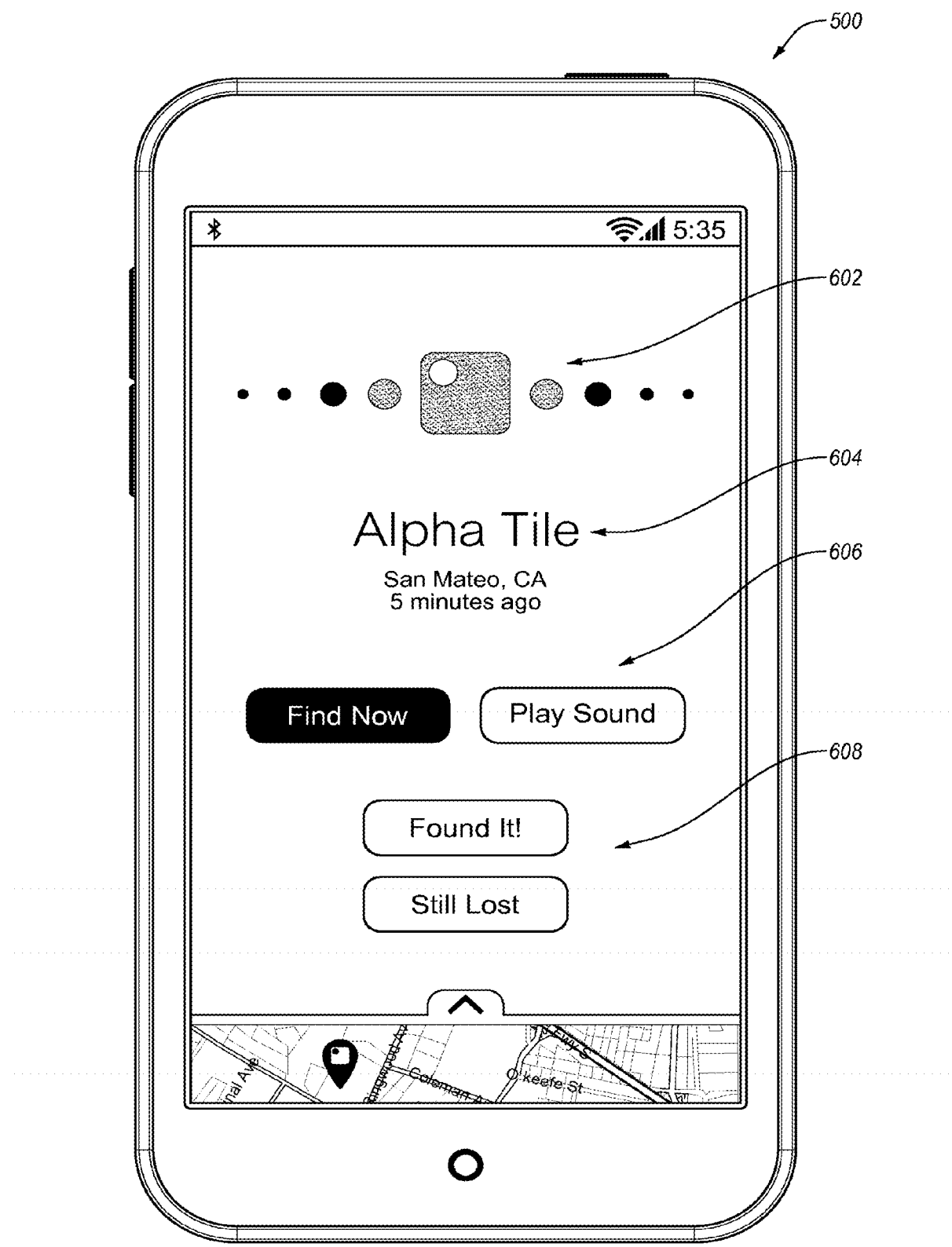
FIGS. 6A-6B illustrate exemplary views of an electronic communication user interface according to principles described herein.
Figure 6B:
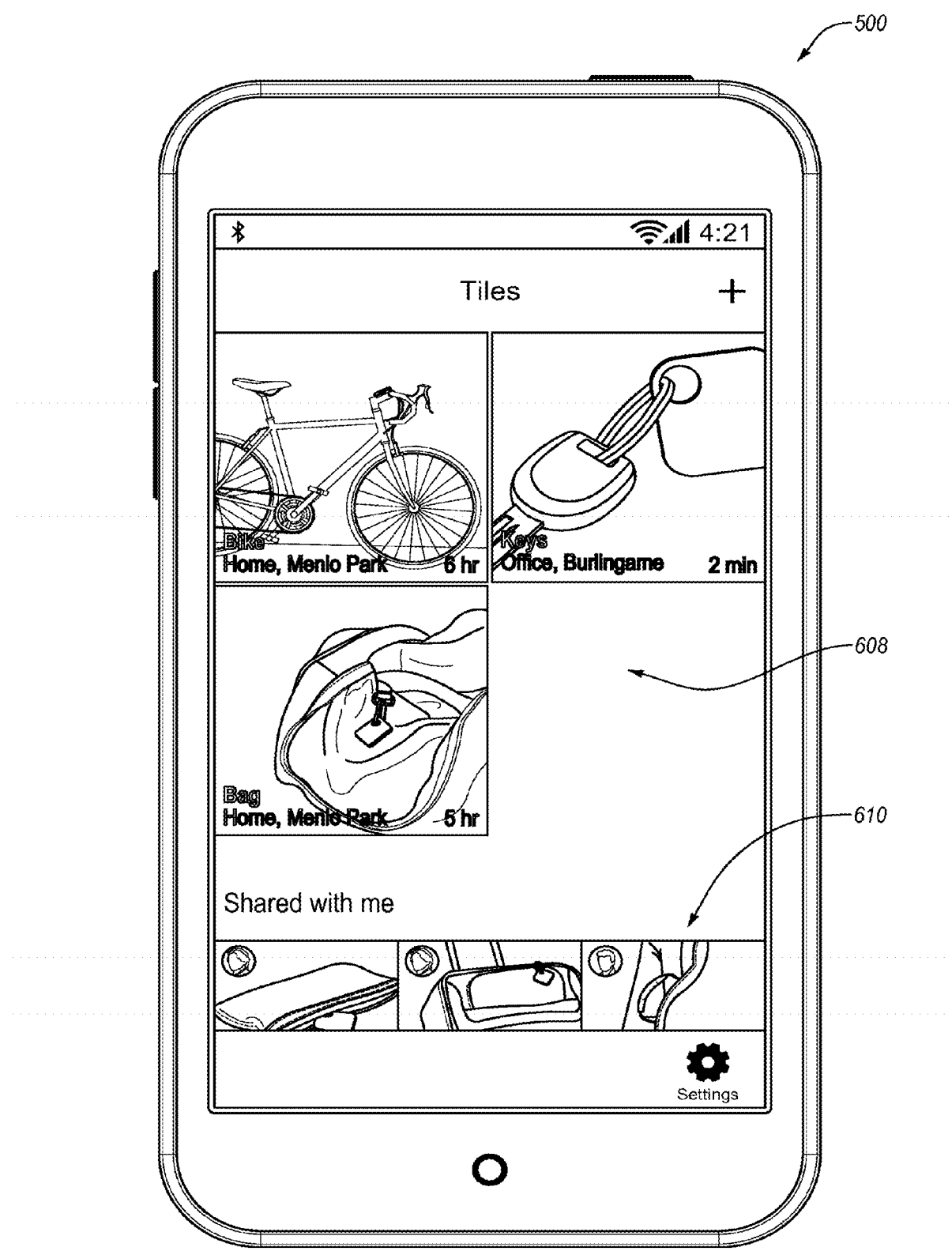

Regardless of the specific type of computing device, the mobile device 500 may be implemented using a variety of configurations. FIGS. 6A-6B illustrate example implementations of the user interface 502 that may be configured using the principles herein.

FIG. 6A illustrates an example of a display of the user interface 502 that facilitates locating the tracking device 106 using the mobile device 500. In one configuration, the user interface 502 may present a proximity indicator 602, tracking device information 604, one or more local tracking options 606, and one or more remote tracking options 608. The proximity indicator 602 may include a visual indication for indicating to the user 103 a degree of proximity of the mobile device 500 to a tracking device 106. For example, the proximity indicator 602 may include a number of icons that light up or turn off based on a detected distance of a tracking device 106 and the mobile device 500. Each icon may correspond to a specific threshold distance based on a strength of a signal detected from the tracking device 106 during a local search. Other types of indicators may be used to demonstrate a degree of proximity of a tracking device 106. For example, a proximity indicator 602 may change colors, provide a hot/cold indicator, or other method for providing the user 103 an indication of how close or far a tracking device is relative to the mobile device.

The user interface may further include a display of tracking device information 604. Tracking device information 604 may include a name of a tracking device 106 that has been assigned by the user 103, a last known location of the tracking device 106 that has been provided to the mobile device 500 and/or tracking system 100, as well as a time at which the last known location was noted (either using the mobile device 500 or a other device in communication with the tracking system 100). In the illustrated example, tracking device information 604 may indicate that a tracking device named "Alpha Tile" was last known to be located in San Mateo, Calif. five minutes earlier. Other tracking device information 604 may also be displayed.

The user interface may also include local tracking options 606. Local tracking options 606 may include causing the tracking device to play a sound, or may include a local tracking option for using the proximity sensor of the mobile device 500 and tracking device 106 to search for and locate the tracking device 106. Other local tracking options 606, including a selection of various views or preferences, may also be displayed. In the illustrated example, the user 103 may select "play sound" to cause a tracking device 106 to emit a sound. Alternatively, the user 103 may select the "find now" option to cause the proximity indicator 602 to visually or audibly indicate a relative proximity between the mobile device 500 and the tracking device 106. Where the user 103 is able to find tracking device 106 via the "find now" or "play sound" option, the user 103 may select a "found it" option to indicate that the tracking device 106 has been located, and the tracking services may be stopped on the mobile device 500. Alternatively, the "found it" option may prompt the mobile device 500 to send an update of the tracking device location to a tracking system 100 to update tracking device information on one or more databases on the tracking system 100.

The user interface also includes one or more remote tracking options 608. The remote tracking options 608 may be used to solicit help from one or more community mobile devices 104 to obtain a location of a tracking device 106. For example, the user 103 may select the "still lost" option in the case that one or more local tracking options 606 are unsuccessful in locating tracking device 106. Selecting the "still lost" option may cause the mobile device 500 to send a lost indication to the tracking system 100. The lost indication may be used by the tracking system 100 to set a flag for the tracking device 106 and/or relay a location request to the community of mobile devices 104. In one configuration, the "still lost" option may be selected to present one or more additional remote tracking options. Remote tracking options 608 may include querying a group of friends with shared access to the tracking device 106, or providing a notification to a friend or known user. Additionally, the remote tracking options 608 may include providing a notification to any or all friends of the user 103 indicating that a tracking device 106 has been lost. In some configurations, the user 103 may select an icon that specifically marks a tracking device 106 as lost, and provides an indication to the tracking system 100 to notify any user within the community of users 105 that the tracking device 106 is lost.

FIG. 6B illustrates an example of a display of the user interface that facilitates locating a tracking device 106 using the mobile device 500. In one configuration, the user interface may present a plurality of tracked objects 608 that are attached to respective tracking devices 106. For example, the user 103 may have a bike, keys, and a bag that are each attached to or associated with respective tracking devices 106. The user interface may display an image or other icon associated with the tracked objects 608. Each tracked object icon 608 may also include information about the tracking device 106 and/or the tracked object 608, such as the last known location and a time at which the tracking device 106 was last detected by the mobile device 500 or a community mobile device 104.

The user interface may also display one or more tracked objects 610 associated with one or more friends of the user. For example, the illustrated user interface illustrates three tracked objects 610 that are not owned by the user 103, but rather associated with other users that are friends of the user 103. The user interface may further display an image or other icon associated with the tracked objects 610 associated with the friends. Additionally, the icons may include user information and/or tracking device information indicating a last known location, a time of the last known location, and any other information that the user 103 has been granted permission to view.

The user 103 may obtain one or more permissions associated with tracking devices 610 of friends. For example, the user 103 may perform a local search for a friend object and provide an update or an indication of the location proximate to the friend object to the tracking system 100 or a mobile device of the friend. In another configuration, the user 103 may perform a remote search for a tracking device 106 associated with a friend according to permissions that have been granted the user 103 from the friend.

Figure 7:
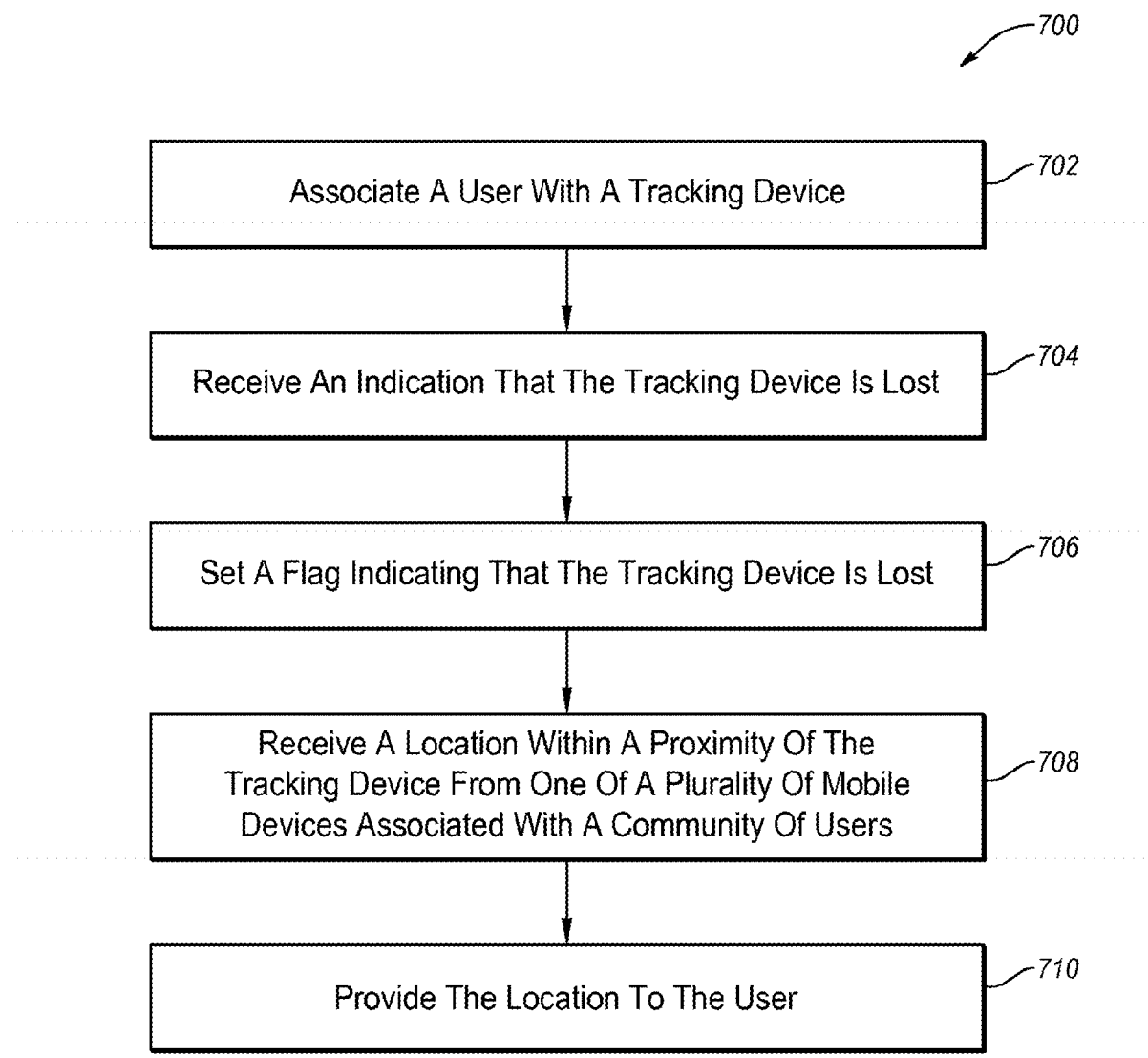
FIG. 7 illustrates an exemplary method of locating a tracking device according to principles described herein.

FIG. 7 illustrates an exemplary method 700 of locating a tracking device 106. While FIG. 7 illustrates exemplary steps according to one embodiment, other embodiments may omit, add to, reorder, and/or modify any of the steps shown in FIG. 7. One or more of the steps shown in FIG. 7 may be performed by any of the components illustrated in the system illustrated in FIG. 1. In one configuration, the method 700 is performed by a tracking system 100.

The user 103 and a tracking device 106 may be associated 702. Associating the user 103 and tracking device 106 may be performed based on information that is received from the user 103 via a mobile device 102. Additionally, a lost indication from the user 103 may be received 704 indicating that a tracking device 106 is lost. The tracking device 100 may set 706 a flag or other indicator indicating that the tracking device 106 is lost. The tracking system 100 may further receive 708 a location within a proximity of the tracking device 106 from one of a plurality of mobile devices associated with a community of users. For example, the location may indicate an estimated location of the tracking device 106. Alternatively, the location may provide a location of the community mobile device 104 within a proximity of the tracking device 106. Further, the tracking system 100 may provide 710 the location that is within a proximity of the tracking device 106 to a mobile device 102 that is associated with the user 103.

Figure 8:
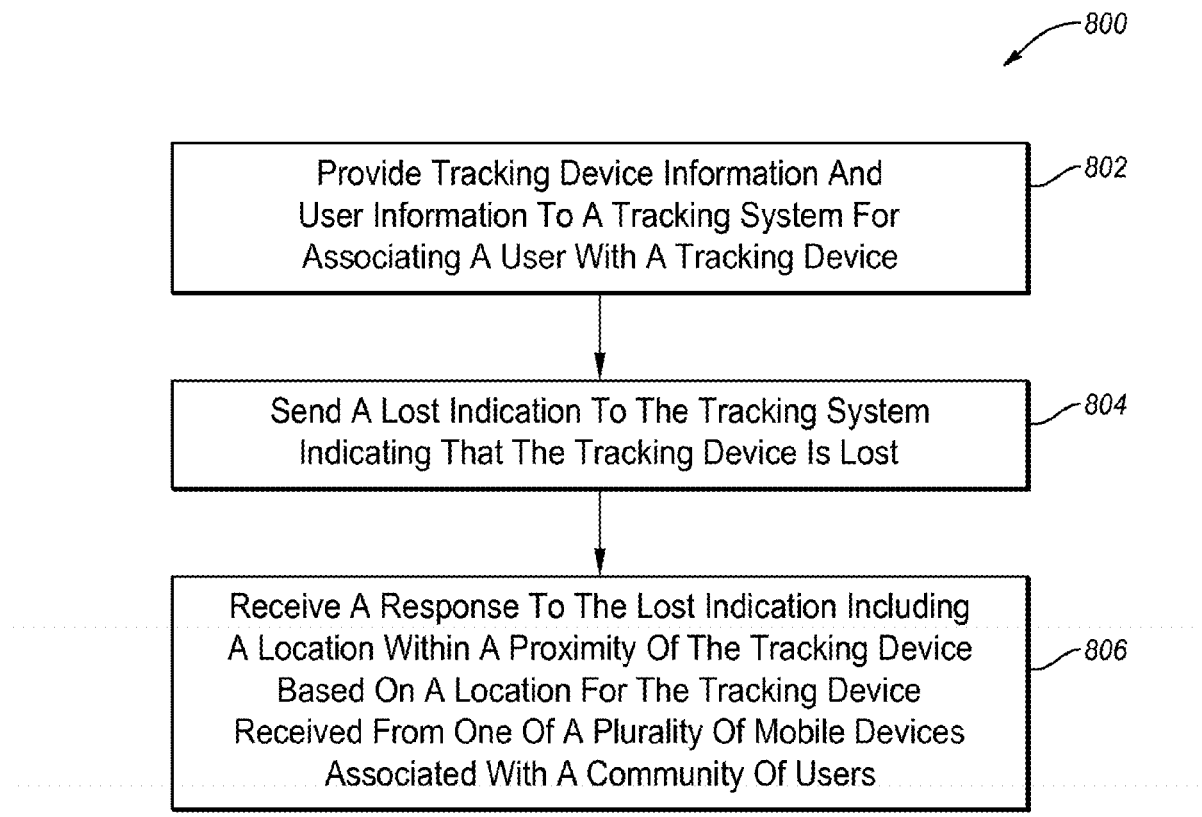
FIG. 8 illustrates another exemplary method of locating a tracking device according to principles described herein.

FIG. 8 illustrates an exemplary method 800 of locating a tracking device 106. While FIG. 8 illustrates exemplary steps according to one embodiment, other embodiments may omit, add to, reorder, and/or modify any of the steps shown in FIG. 8. One or more of the steps shown in FIG. 8 may be performed by any of the components illustrated in the system illustrated in FIG. 1. In one configuration, the method 800 is performed by a mobile device 102 associated with the user 103.

Tracking device information and user information may be provided 802 to a tracking system 100. The information may be provided to the tracking system 100 from a mobile device 102 for associating the user 103 and a tracking device 106. The mobile device 102 may also send 804 a lost indication to the tracking system 100. The lost indication may indicate that the tracking device 106 is lost. As described above, the lost indication may be processed by the tracking system 100 by setting a flag indicating that the tracking device 106 is lost and/or providing a lost request to the community of mobile devices 104. One or more users of the community of users 105 may provide a response to the location request at the tracking system 100. The mobile device 102 may receive 806 a location within a proximity of the tracking device 106 based on a response to the location request. The response to the location request may be provided from one of the plurality of community mobile devices 104 associated with the community of users 105 via the tracking system 100.

Figure 9:
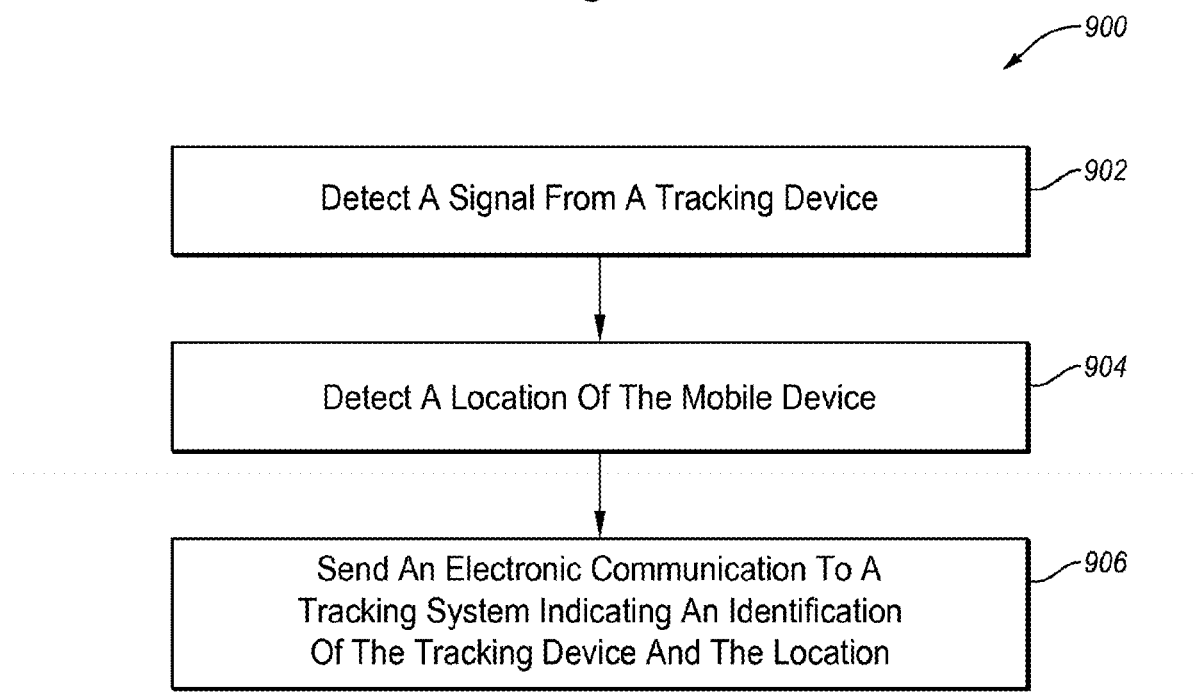
FIG. 9 illustrates yet another exemplary method of locating a tracking device according to principles described herein.

FIG. 9 illustrates an exemplary method 900 of locating a tracking device 106. While FIG. 9 illustrates exemplary steps according to one embodiment, other embodiments may omit, add to, reorder, and/or modify any of the steps shown in FIG. 9. One or more of the steps shown in FIG. 9 may be performed by any of the components illustrated in the system illustrated in FIG. 1. In one configuration, the method 900 is performed by the community mobile device 104 associated with the community user 105.

A signal from a tracking device 106 may be detected 902 at a community mobile device 104. The community mobile device 104 may further detect 904 a location of the community mobile device 104, for example, at the time and location at which the signal from the tracking device 106 is detected. The community mobile device 104 may send 906 an electronic communication to the tracking system 100 indicating an identification of the tracking device 106 and the location of the detected location of the mobile device 104.

Detecting 902 a signal, detecting 904 a location, and sending 906 the electronic communication may be performed by the any of the community mobile devices 104 in the community of mobile devices 104. Further, some or all of the method 900 may be performed by the community mobile device 104 without the knowledge or input from an associated user 105. In other words, the method 900 may be performed on the community mobile device 104 without knowledge of or participation of the user 105 associated with the community mobile device 104. Further, sending the electronic communication may be performed anonymously without conveying identifying information about the community user 105 or the community mobile device 104 that detected the tracking device 106.

Figure 10:
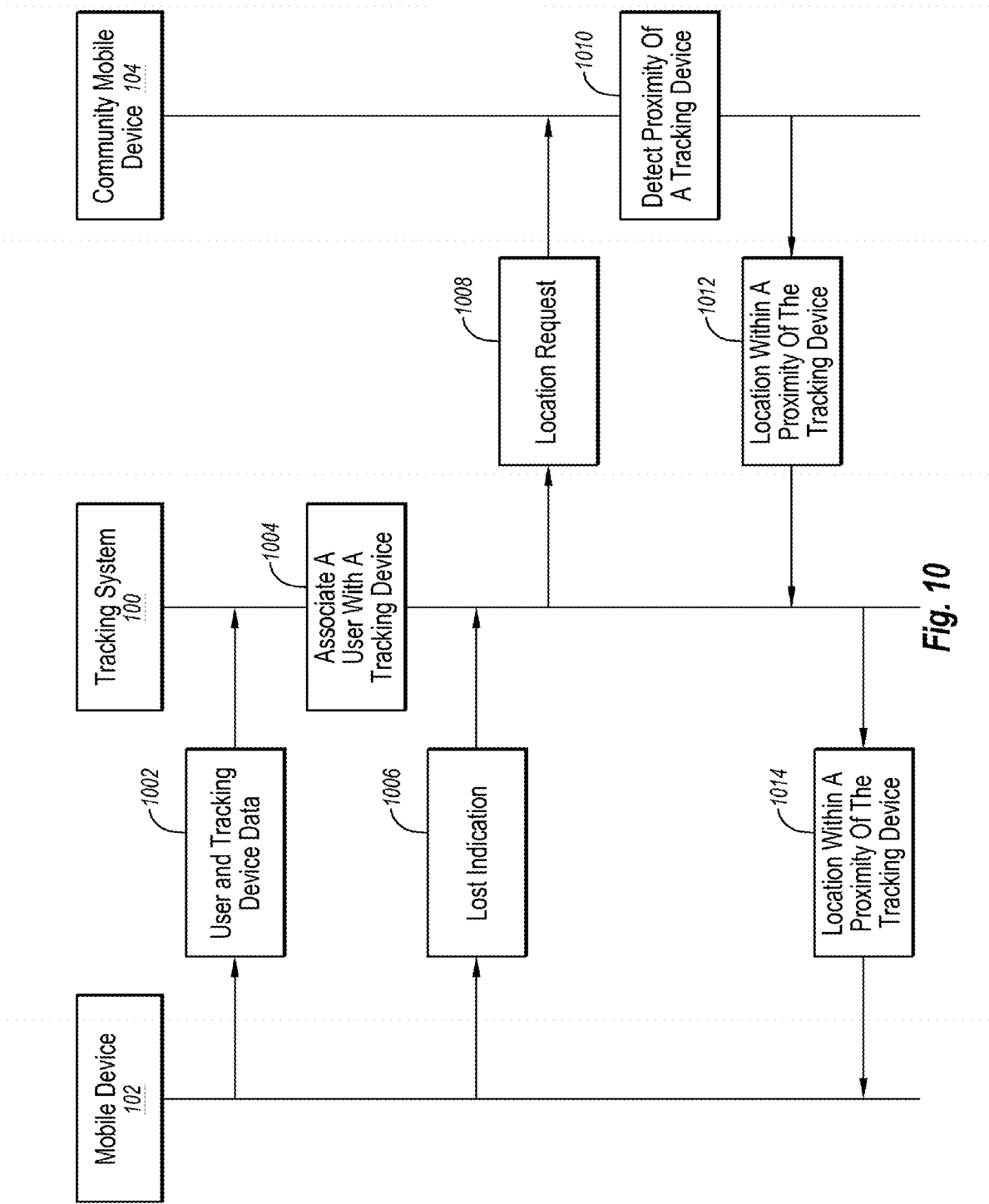
FIG. 10 illustrates a flow diagram according to principles described herein.

FIG. 10 illustrates an exemplary method of locating a tracking device 106. While FIG. 10 illustrates exemplary steps according to one embodiment, other embodiments may omit, add to, reorder, and/or modify any of the steps shown in FIG. 10. One or more of the steps shown in FIG. 10 may be performed by any of the components illustrated in the system illustrated in FIG. 1. In one configuration, steps of the method are performed cooperatively using a mobile device 102, tracking system 100, and the community mobile device 104.

A mobile device 102 provides 1002 user and tracking device data to tracking system 100. The tracking system 100 receives 1002 the user and tracking device data and associates 1004 the user 103 with a tracking device 106. After the user 103 and tracking device 106 have been associated, the mobile device 102 provides 1006 a lost indication to the tracking system 100 indicating that the tracking device 106 is lost or otherwise unavailable. The tracking system 100 receives 1006 the lost indication and provides 1008 a location request to the community mobile device 104. The location request may be provided 1008 to the community mobile device 104 via a broadcast from the tracking system 100 that is transmitted to a plurality of community mobile devices 104. The community mobile device 104 may detect 1010 proximity of a tracking device 106 to the community mobile device 104. In response to the location request and/or upon detecting proximity of the tracking device 106, the community mobile device 104 may provide 1012 a location within a proximity of the tracking device 106 to the tracking system 100. The location provided to the tracking system 100 may indicate an estimated location of the tracking device 106 or a location of the community mobile device 104 at the last known location that is within a proximity of the tracking device 106. The tracking system 100 may receive 1012 the location and provide 1014 the location to the mobile device 102.

Figure 11:
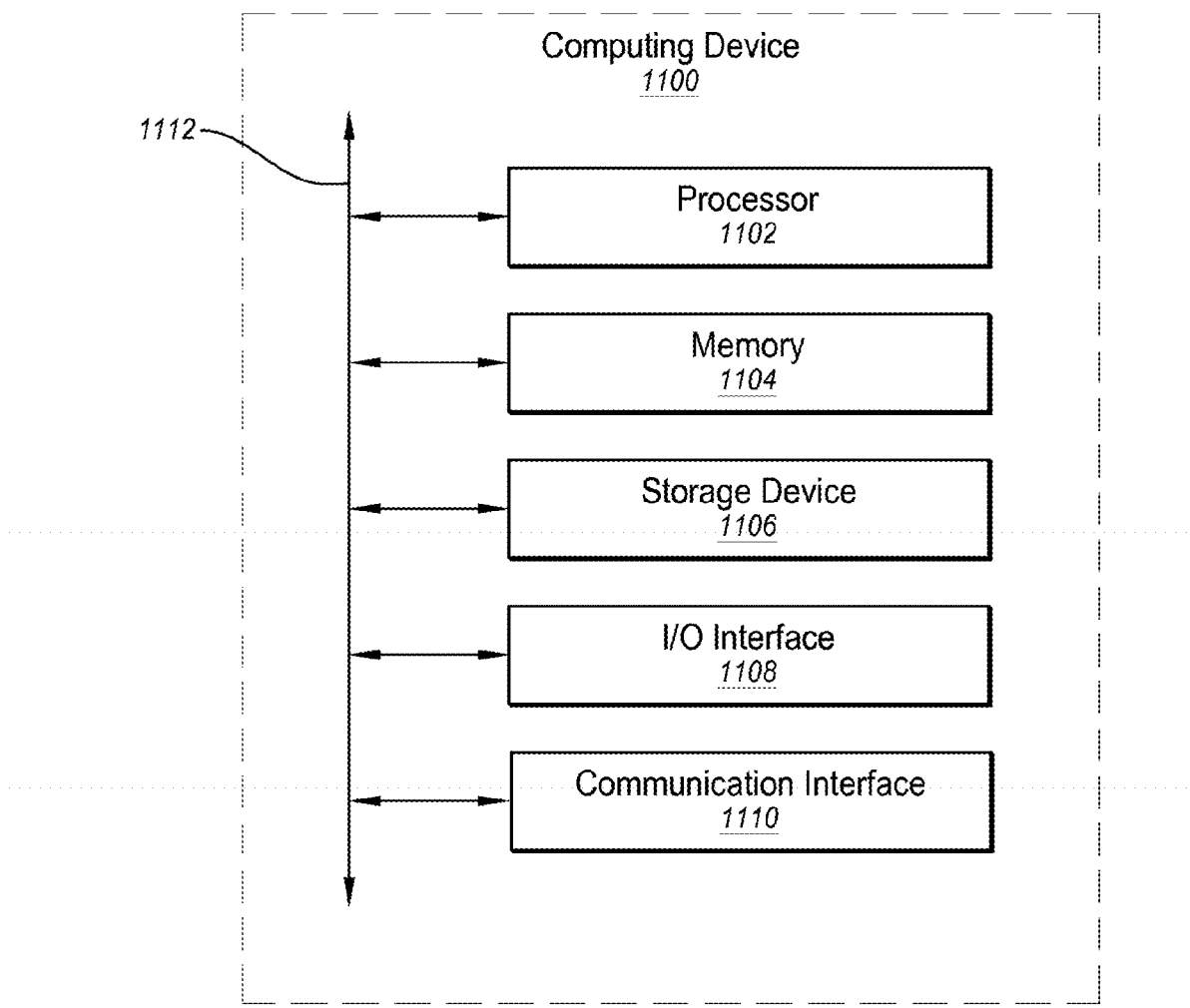
FIG. 11 illustrates a block diagram of an exemplary computing device according to principles described herein.

FIG. 11 illustrates a block diagram of an exemplary computing device 1100 that may be configured to perform one or more of the processes described above. One will appreciate that the mobile device 102, tracking system 100, and community mobile devices 104 each may comprise one or more computing devices in accordance with implementations of the computing device 1100. As shown by FIG. 11, the computing device can comprise a processor 1102, a memory 1104, a storage device 1106, an I/O interface 1108, and a communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other embodiments. Furthermore, in certain embodiments, a computing device 1100 can include fewer components than those shown in FIG. 11. Components of computing device 1100 shown in FIG. 11 will now be described in additional detail.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage device 1106 and decode and execute them. In particular embodiments, processor 1102 may include one or more internal caches for data, instructions, or addresses. As an example and not by way of limitation, processor 1102 may include one or more instruction caches, one or more data caches, and one or more translation lookaside buffers (TLBs). Instructions in the instruction caches may be copies of instructions in memory 1104 or storage 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to the computing device 1100. In particular embodiments, storage device 1106 is non-volatile, solid-state memory. In other embodiments, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to, receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    associating, by a tracking system, a user with a tracking device, the user associated with a mobile device;
    when the tracking device is communicatively coupled to and located within a threshold proximity of the mobile device, receiving, by the tracking system from the mobile device, a location of the mobile device;
    associating, by the tracking system, the received location of the mobile device with the tracking device;
    when the tracking device is located outside a threshold proximity of the mobile device but within a threshold proximity of a second mobile device associated with a second user, receiving, by the tracking system from the second mobile device, a location of the second mobile device, the second mobile device configured to provide the location of the second mobile device to the tracking system in response to finding the tracking device;
    associating, by the tracking system, the received location of the second mobile device with the tracking device; and
    providing, by the tracking system, the location of the second mobile device and an identity of the tracking device to the mobile device, the mobile device configured to display the location of the second mobile device that found the tracking device and an identity of the tracking device within a map interface.

2. The method of claim 1, wherein the mobile device provides the location of the mobile device to the tracking system without input from the user.

3. The method of claim 1, wherein the mobile device provides the location of the mobile device to the tracking system in response to receiving a signal from the tracking device.

4. The method of claim 1, wherein the mobile device provides the location of the mobile device to the tracking system periodically.

5. The method of claim 1, wherein the second mobile device provides the location of the second mobile device to the tracking system without input from the second user.

6. The method of claim 1, wherein the second mobile device provides the location of the second mobile device to the tracking system without informing the second user.

7. The method of claim 1, wherein the tracking device cannot couple to more than one mobile device at a time.

8. The method of claim 1, wherein the tracking system is configured to provide the location of the second mobile device to the mobile device.

9. The method of claim 8, wherein the tracking system provides the location of the second mobile device to the mobile device in response to receiving the location of the second mobile device.

10. The method of claim 8, wherein the tracking system provides the location of the second mobile device to the mobile device in response to a request from the user.

11. The method of claim 10, wherein the request from the user comprises an indication from the user that the tracking device is lost.

12. The method of claim 1, wherein the mobile device displays the location of the second mobile device within the map interface with locations corresponding to additional tracking devices associated with the user.

13. The method of claim 1, wherein the mobile device displays the location of the second mobile device and an indication of a distance between the second mobile device and the tracking device within the map interface.

14. The method of claim 13, wherein the indication of the distance between the second mobile device and the tracking device is based on a strength of signal from the tracking device received by the second mobile device.

15. The method of claim 1, wherein the tracking system receives locations of additional mobile devices, each received location sent by an additional mobile device in response to receiving a signal from the tracking device, and wherein the tracking system associates a received location associated with a most recent time with the tracking device.

16. The method of claim 1, wherein the second mobile device is configured to determine an identity of the tracking device based on the signal received from the tracking device, and where providing the location of the second mobile device to the tracking system comprises providing the location of the second mobile device in association with the determined identity of the tracking device.

17. The method of claim 1, wherein the second mobile device is configured to provide the location of the second mobile device to the tracking system in response to receiving a signal from the tracking device independently of a previously established connection between the user and the second user.

18. A tracking server comprising:
    a non-transitory computer-readable storage medium storing executable instructions that, when executed, cause the tracking server to perform steps comprising:
        associating a user with a tracking device, the user associated with a mobile device;
        when the tracking device is communicatively coupled to and located within a threshold proximity of the mobile device, receiving, from the mobile device, a location of the mobile device;
        associating the received location of the mobile device with the tracking device;
        when the tracking device is located outside a threshold proximity of the mobile device but within a threshold proximity of a second mobile device associated with a second user, receiving, from the second mobile device, a location of the second mobile device, the second mobile device configured to provide the location of the second mobile device to the tracking system in response to finding the tracking device;
        associating the received location of the second mobile device with the tracking device; and
        providing the location of the second mobile device and an identity of the tracking device to the mobile device, the mobile device configured to display the location of the second mobile device that found the tracking device and an identity of the tracking device within a map interface; and a processor configured to execute the instructions.

\* \* \* \* \*